United States Patent [19]

Heitmann et al.

[11] 4,040,251
[45] Aug. 9, 1977

[54] GAS TURBINE COMBUSTION CHAMBER ARRANGEMENT

[75] Inventors: Arnold M. Heitmann, Swampscott; Walter L. Brassert, Belmont; Donald N. Chouinard, Peabody, all of Mass.

[73] Assignee: Northern Research and Engineering Corporation, Cambridge, Mass.

[21] Appl. No.: 649,816

[22] Filed: Jan. 16, 1976

Related U.S. Application Data

[63] Continuation-in-part of Ser. No. 583,793, June 4, 1975, which is a continuation of Ser. No. 346,651, March 30, 1973, abandoned.

[51] Int. Cl.² .......................... F02C 3/08; F02C 7/18; F02C 7/22; F02C 7/30
[52] U.S. Cl. ................................. 60/39.36; 60/39.65; 60/39.74 S
[58] Field of Search ............... 60/39.36, 39.65, 39.74 S

[56] References Cited

U.S. PATENT DOCUMENTS

| | | | |
|---|---|---|---|
| 2,856,755 | 10/1958 | Szydlowski | 60/39.36 |
| 3,018,625 | 1/1962 | Bachle | 60/39.74 S |
| 3,124,933 | 3/1964 | Stram | 60/39.74 S |
| 3,381,471 | 5/1968 | Szydlowski | 60/39.36 |
| 3,921,393 | 11/1975 | Bracken | 60/39.74 S |
| 3,932,988 | 1/1976 | Beaufrere | 60/39.74 S |

*Primary Examiner*—William L. Freeh
*Assistant Examiner*—Robert E. Garrett

[57] ABSTRACT

A gas turbine has a combustion chamber of toroidal configuration that includes separation structure dividing the combustion chamber into an annular primary zone and an annular dilution zone. Injection of compressor discharge air into the primary zone sets up a toroidal recirculation pattern of generally circular cross-sectional configuration. Fuel slinger structure at the inner periphery of the primary zone has a generally cylindrical surface for receiving and distributing fuel in a thin sheet for discharge in a radially outward direction as minute droplets towards the center of the toroidal recirculation pattern. The radial flow of the fuel droplets interacts with said toroidal recirculation pattern and provides intimate mixing of fuel and air, and resulting efficient combustion within said primary zone. The resulting combustion product flows from the primary zone past the separation structure into the dilution zone. Compressor discharge air injected into the dilution zone dilutes the products of combustion from the primary zone.

25 Claims, 5 Drawing Figures

GAS TURBINE COMBUSTION CHAMBER ARRANGEMENT

This application is a continuation-in-part of our co-pending patent application Ser. No. 583,793, filed June 4, 1975 which is a continuation of our patent application Ser. No. 346,651, filed Mar. 30, 1973, and now abandoned, entitled "Gas Turbine".

SUMMARY OF INVENTION

This invention relates to engines and more particularly to gas turbines.

The gas turbine is a rotary engine in which, basically, air is compressed by a compressor, heated in a combustion chamber to such a state that its stored energy (relative to surrounding conditions) is more than that required by the compressor, and expanded through a turbine, the turbine developing sufficient power to drive at least the compressor (and any accessory equipment). During the heating process, fuel is usually added to the air, and the mixture burned in the combustion chamber. In its simplest form, the rotating compressor and turbine components are directly connected on the same shaft and excess power is directly extracted from the compressor-turbine shaft. The power output may also be extracted in the form of thrust by so designing the system components that the hot gases are only partially expanded in the turbine, the turbine developing just sufficient power to drive the compressor, with the remaining energy in the turbine exhaust gases being used to increase the velocity of those gases as they leave the system through a nozzle. The power output may also be extracted in the form of pneumatic power (compressed air) by designing the system components so that the total air flow through the compressor is significantly greater than that in the turbine, the turbine again developing just sufficient power to drive the compressor. Such a turbine system is called a bleed air system, since that pneumatic power is obtained by "bleeding" the excess, high pressure air from the compressor exit.

An object of this invention is to provide a novel and improved gas turbine system of increased performance and lower specific fuel consumption (higher thermal efficiency) than previously known comparable gas turbine systems.

Another object of this invention is to provide a novel and improved gas turbine that may be economically constructed and is relatively easy to maintain.

Another object of the invention is to provide a novel and improved gas turbine which is efficient in operation and produces low emission or other output contaminants.

A further object of the invention is to provide novel and improved combustion chamber and fuel supply configurations particularly useful in gas turbine systems.

In accordance with a feature of the invention, there is provided in a gas turbine a combustion chamber of annular configuration which has two distinct zones, a primary zone and a dilution zone. A strong toroidal recirculation of generally circular cross-sectional configuration is set up by the injection of compressor discharge air into the primary zone, the injection air being directed against a smoothly curved surface and deflected by that surface into a toroidal circulation pattern for flow across a fuel distributor. The fuel distributor receives fuel from a stationary supply source and preferably forms that fuel into a thin uniformly distributed film on an annular distribution surface of generally cylindrical configuration. That distribution surface is preferably coned slightly outwardly and the fuel, as it moves along the distribution surface, is formed into a thin film. The thin film of fuel flows over the end of the distribution surface, and as the fuel leaves the distribution surface, it is accelerated radially under centrifugal force and breaks up into minute droplets which flow outwardly across the flow of compressor air adjacent the distributor in a direction generally normal to that flow of compressor air. The droplets of fuel mix with the compressor discharge air such that uniform and efficient injection and mixing of fuel and air in the primary zone of the combustion chamber is provided. Rapid and efficient combustion takes place and the resulting combustion products flow radially outwardly and into the dilution zone. In the dilution zone the products of combustion from the primary zone are mixed with additional amounts of compressor discharge air prior to flow to the expansion stage of the turbine.

In a particular embodiment, the combustor chamber is fabricated of four formed sheet members and assembled in manner that does not require welding or similar fastening techniques and provides an economical and efficient combustion chamber arrangement.

In accordance with further features, the fuel distributor is of the slinger type and includes an annular supply region into which fuel flows from the stationary supply source. An annular dam or web separates the supply region from a cylindrical distribution surface and passages through the web function to accelerate the fuel to the peripheral velocity of the slinger while restricting the rate of flow onto the annular distribution surface. A further feature of the slinger in a particular embodiment is the provision of an axial vent to the rear of the slinger for control of air leakage through the slinger so that detrimental foaming of fuel is eliminated. Additionally, the outer surface of the stationary fuel supply lip is of conical configuration so that any fuel that flows to this lip drops back into the rotating slinger. A series of vanes in the hub of the slinger drive compressor discharge air to the rear of the slinger for combustor cooling purposes without excessive pressure drop.

Gas turbines of the type disclosed herein are compact units and have been designed to provide powers in the range of 100–500 horsepower in three frame sizes in economical, efficient and versatile arrangements. Such turbines have a variety of uses including automotive, marine, and air compressor applications.

Other objects, features and advantages will be seen as the following description of a particular embodiment progresses, in conjunction with the drawings, in which:

DESCRIPTION OF PARTICULAR EMBODIMENT

Figure 1:
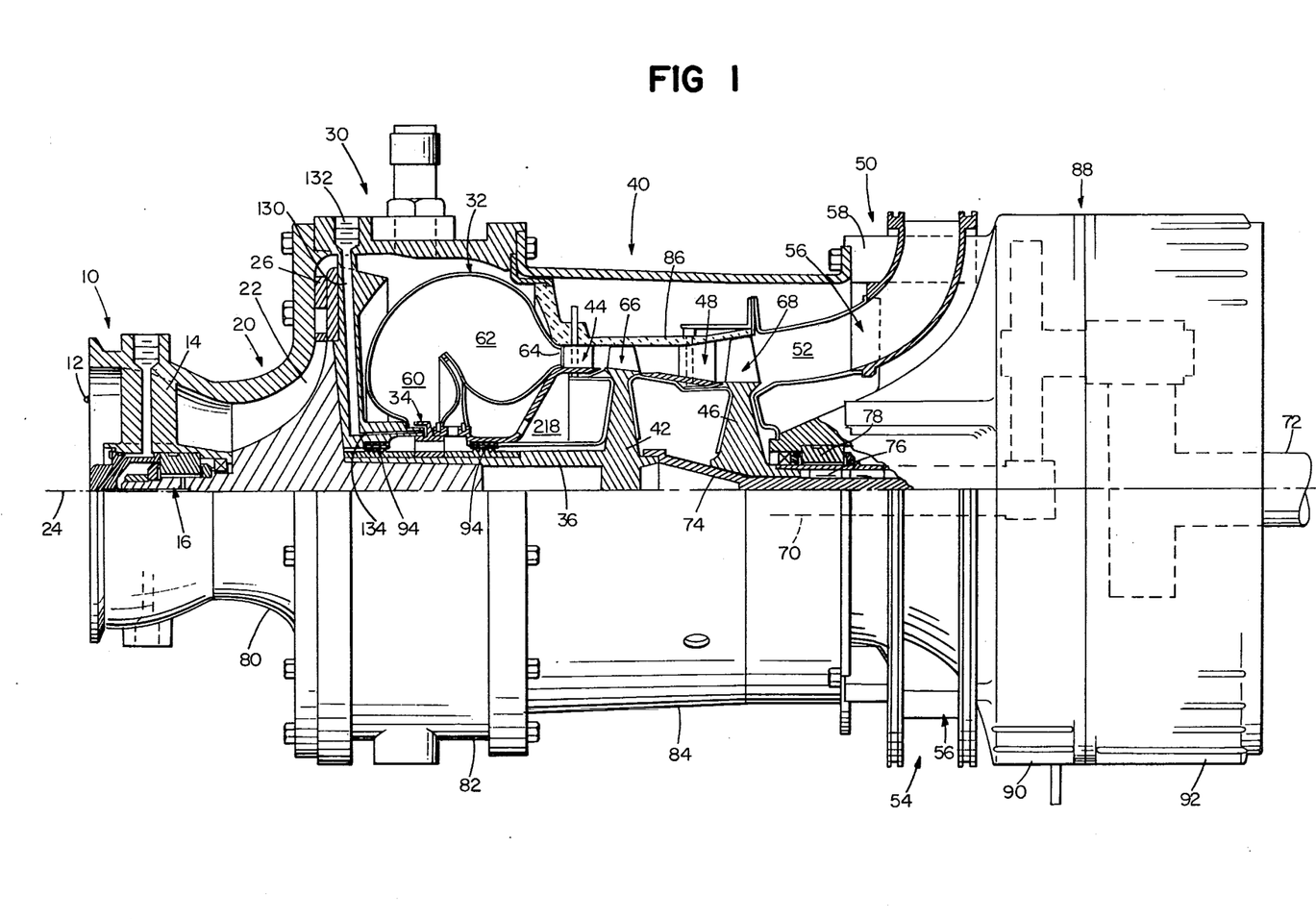
FIG. 1 is a side elevational view, partially in cross-section, of a gas turbine constructed in accordance with the invention.

The gas turbine shown in FIG. 1 has an inlet stage 10 which defines an inlet opening 12 and in which are positioned three struts 14 which support a front bearing assembly 16. Following the inlet stage is a compressor stage 20 which includes an impeller 22 mounted for rotation about system axis 24, and diffuser and straightening vanes 26. A combustion stage 30 follows the compressor stage 20 and includes an annular combustion chamber 32 and a fuel slinger 34 mounted on shaft 36 which in turn is coupled to and rotates as a unit with compressor impeller 22.

The turbine or expansion stage 40 includes a gasifier turbine wheel 42 and associated gasifier nozzle structure 44 and power turbine wheel 46 and associated nozzle structure 48. Coupled to the outlet of the power turbine stage is exhaust duct structure 50 which defines an annular passage 52 with a discharge port 54 at its periphery. Five hollow vanes 56 of air foil configuration are disposed in passage 52 and a coupling strut 58 extends through each vane 56.

Air enters the turbine engine at entrance port 12 for flow past the three radial struts 14 into compressor stage 20 and is compressed to a pressure ratio of approximately 5:1. The compressed air then flows through diffuser vanes 26 and enters combustion stage 30. A toroidal circulation pattern of generally circular cross-section is set up in primary zone 60 and fuel is injected into that toroidal flow by rotating slinger 34, combustion takes place in primary zone 60 and the resulting heated gases flow radially outward and then axially rearwardly through dilution zone 62, the resulting gas temperature being in the range of approximately 1700° F at the outlet 64 of the combustion chamber. The heated gases then flow through the gasifier turbine nozzles 44 and the blades 66 of the gasifier turbine 42 to drive compressor impeller 22 and fuel slinger 34 via shaft 36. After passing from the gasifier turbine, the gases flow through the power turbine nozzle 48 and the blades 68 of the power turbine 46 to drive the power turbine shaft 70 and, via the output gears, output shaft 72. The gases from the power turbine stage flow radially outwardly through the diffusion and exhaust structure 50. In regenerative or recuperative versions of the engine, the exhaust gases may be passed through a heat exchanger before being discharged, the heat exchanger being used to heat compressor discharge air before introduction into combustor stage 30.

The compressor impeller 22 and fuel slinger 34 are mounted on and driven by the gasifier turbine through a shaft assembly that includes a forward portion supported by bearing assembly 16, and a rear shaft extension 74 which is supported by bearing assembly 76 within power turbine shaft 70 which in turn is supported by main bearing assembly 78.

The static structure of the engine consists primarily of the compressor shroud member 80 which includes structure defining the inlet port 12, combustor housing 82, turbine casing 84 in which is mounted turbine shroud 86, and gear case 88 which comprises housing members 90 and 92, struts 58 connecting casing member 90 to turbine casing 84. This static structure is designed so that exposed portions of the turbine assembly are relatively cool and provide a stiff support for the bearing assemblies located at the forward and rear ends of the compressor-turbine unit.

Figure 5:
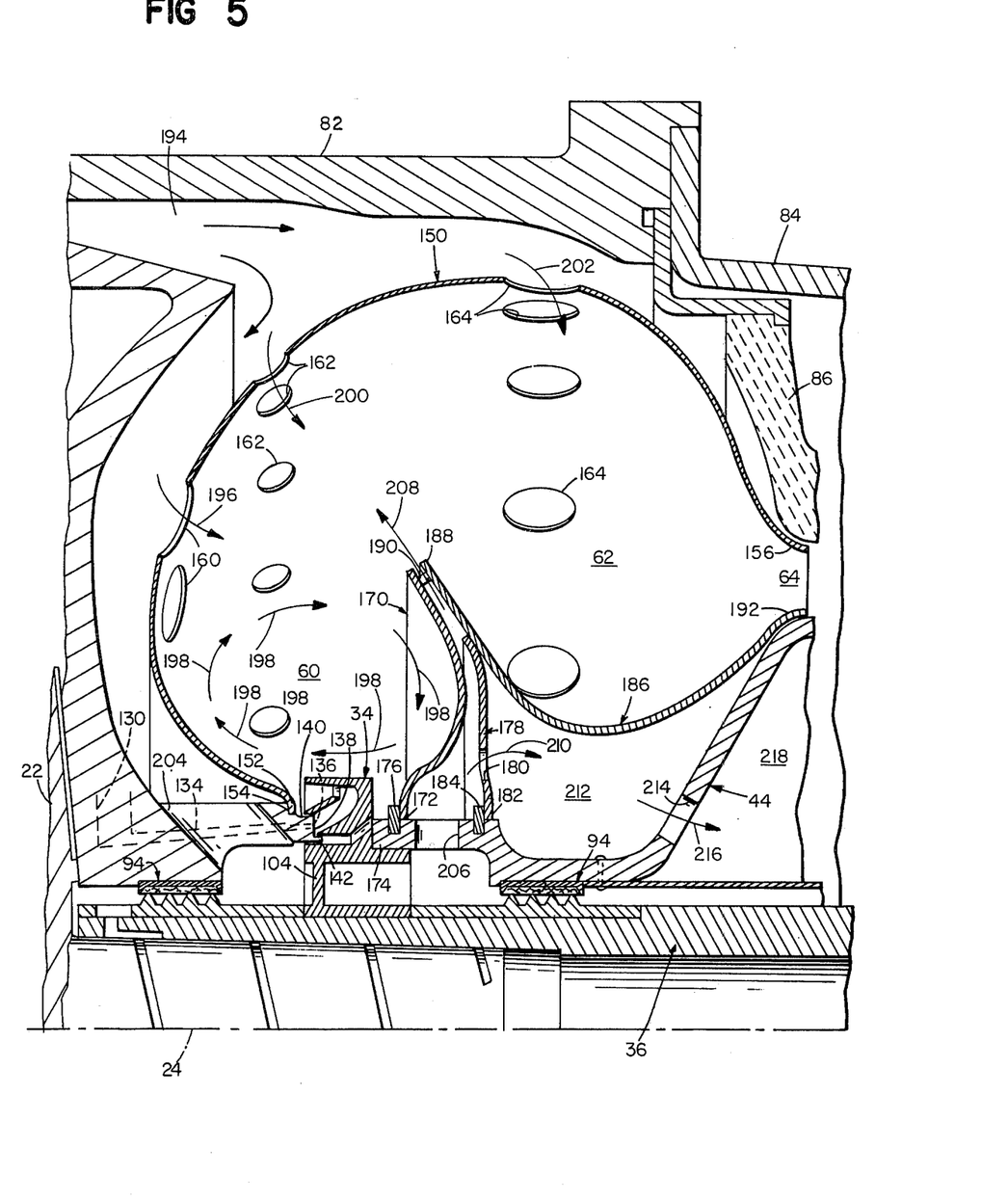
FIG. 5 is an enlarged, detailed, cross-sectional view showing features of the combustion chamber incorporated in the gas turbine shown in FIG. 1

Mounted on gasifier turbine shaft 36 between two labyrinth seals 94 is fuel slinger 34, additional details of which may be seen with reference to FIGS. 2-5. Slinger 34 includes an inner annular hub member 100 and an outer annular hub member 102 between which are disposed vanes 104 that are inclined at an angle of about 20° as indicated in FIG. 5, and act to force air through the hub as the shaft 36 and slinger 34 rotate. Extending radially out from outer hub 102 is a radial flange or wall 106. Projecting forwardly from wall 106 is annular inner lip member 108, which is spaced from hub 102 by annular recess 110. At the rear end of recess 110 are a series of fifty equally spaced passages 112 which extend through wall 106 and are inclined at an angle of about 35° to system axis 24. The outer surface 114 of lip 108 is a smoothly curved surface that extends to annular outer flange 116. Extending inwardly intermediate the ends of flange 116 is an annular web or dam member 118 which has a inclined lip portion 120 disposed at an angle of 35° to the axis 24. Fifty ports 122, each about one millimeter in length and one millimeter in diameter, pass through web 118. The inner surface 124 of annular flange 116 extending away from ports 122 on the side away from wall 106 is generally cylindrical and has an outward taper of about 1° and functions as a distribution surface along which fuel flows for discharge in a thin uniformly distributed sheet over radial lip 126.

Cooperating with fuel slinger 34 is stationary fuel supply structure 128. With reference to FIGS. 1 and 5, passage 130 extends from port 170 radially inward to passage 134 which extends generally axially at an angle of 5° to the axis 24 of shaft 36 to a port 136 in annular end surface 138. Outer surface 140 is inclined at an angle of 15° to system axis 24. Annular lip 142 extends radially inwardly of surface 138.

In assembly, as shown in FIG. 5, surface 138 is disposed adjacent lip 108 and inside lip surface 120; the outlet port 136 of passage 134 is radially outward of fuel receiving surface 114; inclined surface 140 lies below the end of inclined web 120; and lip 142 is disposed in recess 110 and cooperates with lip 108 to define a labyrinth type path. Fuel under pressure flows from passage 134 onto inclined fuel receiving surface 114 for flow under centrifugal force up into the annular supply chamber at the intersection of wall 106 and flange 116 and from that chamber through acceleration and distribution passages 122 onto generally cylindrical distribution surface 124 where the fuel is uniformly dispersed into a thin film. This thin film of fuel flows along distribution surface 124 and over the discharge lip 126 of the slinger and as the fuel moves in a radially outward direction into annular combustion zone 60 it breaks into minute droplets.

The combustor chamber 32 is defined by four annular combustor liner elements which may be best seen with reference to FIG. 5. All of the liner elements are made of Hasteloy X and have a nominal stock thickness of 0.020 inch. Outer liner element 150 is a shaped member that has an inner lip 152 which is seated on surface 154 of housing 82; and an outer lip 156 which is adjacent shroud 86. Disposed in liner 150 are a series of twelve circumferentially arranged and equally spaced primary ports 160, each about ⅜ inch in diameter; a series of 24 circumferentially disposed and equally spaced secondary ports 162, each about 3/16 inch in diameter; and a third series of 24 circumferentially arranged and equally spaced dilution ports 164. each about ⅜ inch in diameter.

Figure 2:
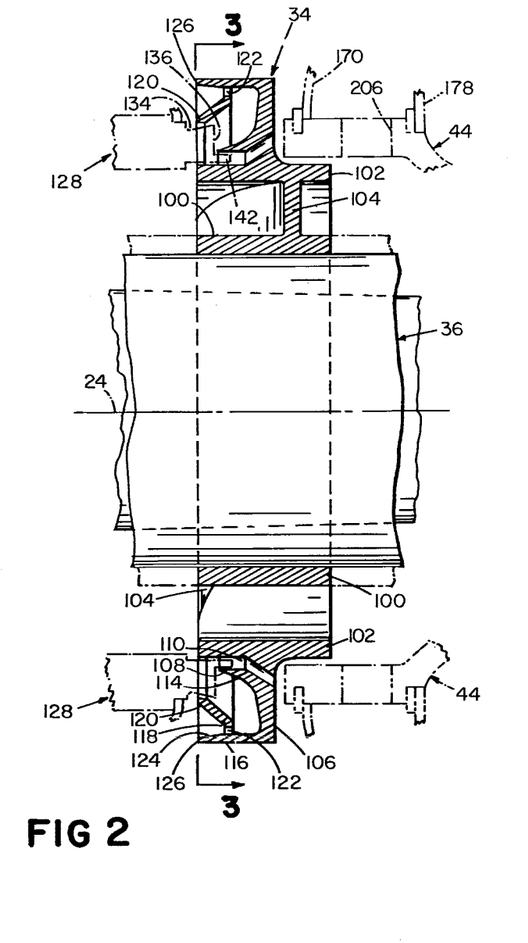
FIG. 2 is an enlarged cross-sectional view of the fuel slinger employed in conjunction with the combustion chamber shown in FIG. 1.
Figure 3:
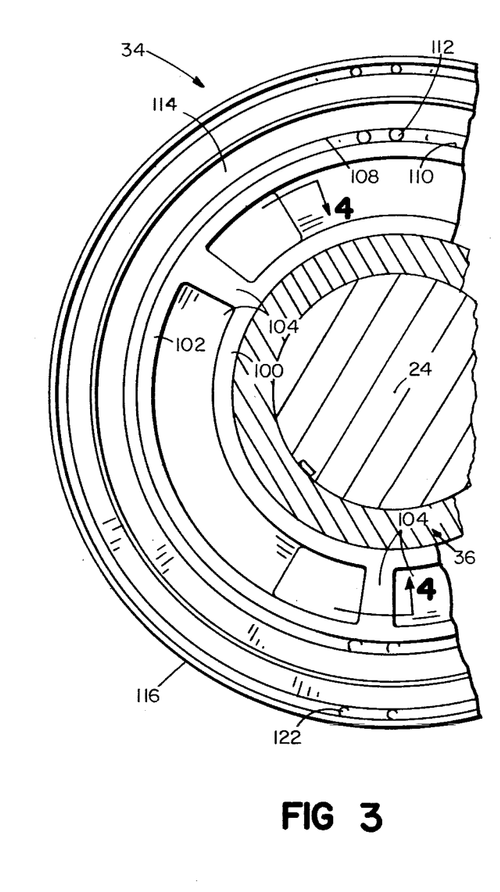
FIG. 3 is a partial elevational view taken along the line 3—3 of FIG. 2.
Figure 4:
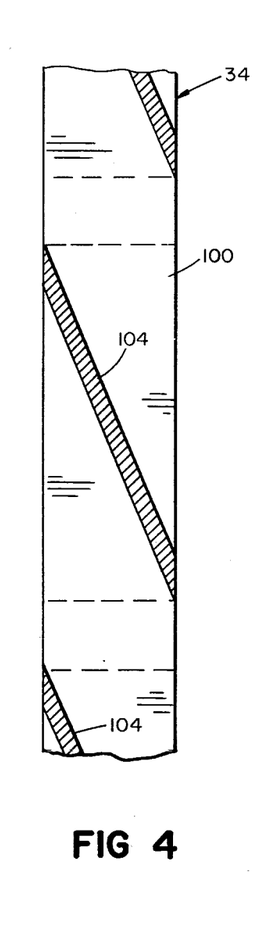
FIG. 4 is a development view taken along the line 4—4 of FIG. 3 showing the configuration of vanes through the hub of the fuel slinger.

A second combustor liner member 170 is of smoothly curved dished configuration as indicated in FIG. 2 and provides a principal flow control to establish the toroidal flow pattern in the primary zone 60. Its inner periphery 172 is seated on portion 174 of the gasifier nozzle structure 44 and secured in place by snap ring 176. A third liner member 178, of less dished configuration than liner member 258, has a series of twenty equally spaced and circumferentially arranged ports 180. The inner periphery 182 of member 178 is also seated on the gasifier nozzle structure 44 and secured in place by snap ring 184. The fourth combustor liner member 186 has a forward end 188 which carries a series of sixteen equally spaced rivets 190 which engage the outer periphery of liner 170 and function as spacers to define a flow path between liners 170 and 186, and a rear end 192 which is seated on the surface of gasifier nozzle structure 44. Exit port 64 is thus defined by liners 150 and 186.

In operation, air from compressor 20 enters into the chamber defined by housing 82 through passages 194 for flow around combustor liner 152 as indicated by arrows, primary air entering through ports 160 in a generally axial direction as indicated by arrow 196 and impinging on and being deflected downwardly by liner 170 to set up a toroidal flow pattern of generally circular cross-section as indicated by arrows 198 in the subchamber 60 defined principally by the lower inner portion of outer liner 150 and liner 170, this flow being in the clockwise direction as viewed in FIG. 5. Additional air is introduced through secondary ports 162 as indicated by arrow 200 and is directed towards lips of liners 170 and 186 to reinforce the circulation 198 and also to cool the lips of liners 170 and 186. Dilution air enters through ports 164 as indicated by arrow 202 to wash liner section 186 and to reduce the temperature of the exit air. In addition, compressor air flows down towards shaft 36 and through passages 204 to the hub of slinger 34. That air is driven by vanes 104 for flow through ports 206 in the gasifier nozzle structure 44 and up through the passage between liner members 170 and 178 for discharge between the lips of liner members 170 and 186 as indicated by arrow 208. Air also flows through ports 180 in liner 178 as indicated by arrow 210 into annular chamber 212 and across the external surface of liner 186 and through ports 214 in the gasifier nozzle structure 44 as indicated by arrow 216 for flow into chamber 218. Thus there is flow of compressor air over external surfaces of all four combustion chamber liner members.

The compressed primary air (arrow 196) flows into and across the primary zone 60 and is directed downwardly and rearwardly by liner member 170, setting up a toroidal recirculation pattern 198 with a flow of air flow along and parallel to the cylindrical outer surface of slinger flange 116. The fuel in a thin sheet of minute droplets flows radially outward from the slinger lip 126 into the toroidal circulation zone 198 for intimate mixing with the compressed air and uniform efficient burning, establishing a temperature in the order of 3,000° F. The hot gases flow from the toroidal combustion zone 60 radially outwardly past the lip of liner 170 and into the larger dilution zone 62 where the air flow through the dilution ports 164 reduces the gas temperature to the order of 1700° F for flow through the combustor chamber outlet port 64 into the nozzle structure 44 of the gasifier turbine 42.

The annular combustor-slinger fuel injector arrangement provides cost reduction, lower emissions and fuel system simplification. The fuel slinger system requires only minimum fuel pressure and has excellent fuel distribution and droplet size characteristics; in addition it is tolerant of dimensional variations and dirt. The combustor liners are simple sheet metal spinnings that have no weldments, fussy cooling geometries, or critical dimensional tolerances. Further advantages flow from the symmetry and cooling control that is possible with the annular configuration and the particular primary zone design of this engine.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. A gas turbine comprising:
   a rotatable unit mounted for rotation about a system axis, said rotatable unit including a compression component and an expansion component,
   a combustion chamber disposed between said compression and expansion components, said gas turbine having a gas flow path serially through said compression component, said combustion chamber, and said expansion component,
   said combustion chamber being of toroidal configuration and having two distinct annular zones, a primary zone and a dilution zone, structure in said combustion chamber having a radially extending imperforate dished surface, first ports in said combustion chamber for injecting discharge air from said compression component into said primary zone toward said dished surface, said dished surface deflecting injected compressor discharge air in a radially inward direction and setting up a toroidal recirculation pattern of generally circular cross-sectional configuration in said primary zone, said toroidal recirculation pattern including an annular flow component adjacent the inner periphery of said primary zone that is generally coaxial with said system axis and is moving toward said compression component,
   fuel injecting structure at the inner periphery of said primary zone including a stationary fuel supply source and slinger structure mounted for rotation about said system axis and spaced from the discharge end of said supply source, said slinger structure having a generally cylindrical radially inwardly facing fuel distribution surface that is disposed coaxially with said system axis and that has a closed end and an open end, said open end being closer to said compression component than said open end, said fuel distribution surface receiving fuel from said supply source for distribution and flow in a thin annular sheet across said generally cylindrical surface and discharge from the open end of said surface in a radially outward direction in a thin radial sheet of minute droplets across said annular flow component in a direction generally normal thereto and towards the center of said toroidal recirculation pattern, the radial flow of fuel droplets interacting with said toroidal recirculation pattern for achieving intimate mixing of fuel and air, and resulting efficient combustion within said primary zone, the resulting product flowing from said primary zone into said dilution zone, and second ports in said combustion chamber for injecting discharge air from said compression component into said dilution zone, the injection of compressor discharge air into said dilution zone diluting the products of combustion from said primary zone prior to flow to said expansion component.

2. The turbine as claimed in claim 1 and further including separation structure defining third ports for injection of discharge air from said compression component in a radially outward direction between said primary and dilution zones and generally tangential to the toroidal recirculation pattern in said primary zone.

3. The turbine as claimed in claim 2 and further including structure for driving discharge air from said compression component to the rear of said fuel injecting structure for flow through said third ports.

4. The turbine as claimed in claim 1 wherein said distribution surface is coned slightly outwardly.

5. A gas turbine comprising:
a rotatable unit mounted for rotation about a system axis, said rotatable unit including a compression component and an expansion component,
a combustion chamber disposed between said compression and expansion components, said gas turbine having a gas flow path serially through said compression component, said combustion chamber, and said expansion component,
said combustion chamber being of toroidal configuration and having two distinct annular zones, a primary zone and a dilution zone, structure in said combustion chamber having a radially extending dished surface, first ports in said combustion chamber for injecting discharge air from said compression component into said primary zone toward said dished surface, the injection of compressor discharge air into said primary zone against said dished surface setting up a toroidal recirculation pattern of generally circular cross-sectional configuration in said primary zone, said toroidal recirculation pattern including an annular flow component adjacent the inner periphery of said primary zone that is generally coaxial with said system axis,
fuel injecting structure at the inner periphery of said primary zone including a stationary fuel supply source and slinger structure mounted for rotation about said system axis and spaced from the discharge end of said supply source, said slinger structure having a hub with a series of vanes therein for driving compressor discharge air to the rear of said slinger structure for cooling said combustion chamber and a generally cylindrical fuel distribution surface that is disposed coaxially with said system axis and receives fuel from said supply source for distribution and flow in a thin sheet across said generally cylindrical surface and discharge from said surface in a radially outward direction in a thin radial sheet of minute droplets across said annular flow component in a direction generally normal thereto and towards the center of said toroidal recirculation pattern, the radial flow of fuel droplets interacting with said toroidal recirculation pattern for achieving intimate mixing of fuel and air, and resulting efficient combustion within said primary zone, the resulting combustion product flowing from said primary zone into said dilution zone, and second ports in said combustion chamber for injecting discharge air from said compression component into said dilution zone diluting the products of combustion from said primary zone prior to flow to said expansion component.

6. A gas turbine comprising:
a rotatable unit mounted for rotation about a system axis, said rotatable unit including a compression component and an expansion component,
a combustion chamber disposed between said compression and expansion components, said gas turbine having a gas flow path serially through said compression component, said combustion chamber, and said expansion component,
said combustion chamber being of toroidal configuration and having two distinct annular zones, a primary zone and a dilution zone, structure in said combustion chamber having a radially extending dished surface, first ports in said combustion chamber for injecting discharge air from said compression component into said primary zone toward said dished surface, the injection of compressor discharge air into said primary zone against said dished surface setting up a toroidal recirculation pattern of generally circular cross-sectional configuration in said primary zone, said toroidal recirculation pattern including an annular flow component adjacent the inner periphery of said primary zone that is generally coaxial with said system axis,
fuel injecting structure at the inner periphery of said primary zone including a stationary fuel supply source and slinger structure mounted for rotation about said system axis and spaced from the discharge end of said supply source, said slinger structure having a generally cylindrical fuel distribution surface that is disposed coaxially with said system axis, is coned slightly outwardly, a hub with a series of vanes therein for driving compressor discharge air to the rear of said slinger structure for cooling said combustion chamber, an axial vent to the rear of said slinger structure for control of air leakage through said slinger structure, and said stationary fuel supply includes an annular lip portion closely adjacent and cooperating with a lip portion of said slinger structure to define a labyrinth path, and an outer surface of conical configuration so that any fuel that flows to said surface tends to drop back into said rotatable slinger structure, said slinger structure receiving fuel from said fuel supply for distribution and flow in a thin sheet across said generally cylindrical surface and discharge from said surface in a radially outward direction in a thin annular sheet of minute droplets across said annular flow component in a direction manually normal thereto and towards the center of said toroidal recirculation pattern, the radial flow of fuel droplets interacting with said toroidal recirculation pattern for achieving intimate mixing of fuel and air, and resulting efficient combustion within said primary zone, the resulting combustion product flowing from said primary zone into said dilution zone, and second ports in said combustion chamber for injecting discharge air from said compression component into said dilution zone diluting the products of combustion from said primary zone prior to flow to said expansion component.

7. A gas turbine comprising:

a rotatable unit mounted for rotation about a system axis, said rotatable unit including a compression component and an expansion component, a combustion chamber disposed between said compression and expansion components, said gas turbine having a gas flow path serially through said compression component, said combustion chamber, and said expansion component, said combustion chamber being fabricated of a plurality of formed sheet members that are free to move relative to one another, comprising an outer main member in which said first and second ports are disposed, second and third annular sheet members cooperating to define structure separating said primary and dilution zones and being spaced to define a passage for flow of compressor discharge air between said second and third sheet members and radially outwardly into said combustion chamber between said primary and dilution zones, and a fourth annular sheet member cooperating with said main member to define an annular port through which combustion products are discharged from said dilution zone to said expansion component, said combustion chamber being of toroidal configuration and having two distinct annular zones, a primary zone and a dilution zone, structure in said combustion chamber having a radially extending dished surface, first ports in said combustion chamber or injecting discharge air from said compression component into said primary zone toward said dished surface, the injection of compressor discharge air into said primary zone against said dished surface setting up a toroidal recirculation pattern of generally circular cross-sectional configuration in said primary zone, said toroidal recirculation pattern including an annular flow component adjacent the inner periphery of said primary zone that is generally coaxial with said system axis, fuel injecting structure at the inner periphery of said primary zone for injecting fuel in a radially outward direction in a thin annular sheet of minute droplets across said annular flow component and towards the center of said toroidal recirculation pattern, the radial flow of fuel droplets interacting with said toroidal recirculation pattern for achieving intimate mixing of fuel and air, and resulting efficient combustion within said primary zone, the resulting combustion product flowing from said primary zone into said dilution zone, and second ports in said combustion chamber for injecting discharge air from said compression component into said dilution zone, the injection of compressor discharge air into said dilution zone diluting the products of combustion from said primary zone prior to flow to said expansion component.

8. The turbine as claimed in claim 7 and further including rotatable structure including a rotatably mounted hub having series of vanes therein for driving compressor discharge air to the rear of said fuel injecting structure for flow into the passage between said second and third sheet members and for cooling said fourth sheet member.

9. The turbine as claimed in claim 7 wherein said second sheet member defines said radially extending dished surface.

10. A gas turbine comprising a rotatable unit, said rotatable unit including a compression component and an expansion component, a toroidal combustion chamber disposed between said compression and expansion components, exhaust duct structure, said gas turbine having a gas flow path serially through said compression component, said combustion chamber, said expansion component and said exhaust duct structure, said combustion chamber being fabricated of a plurality of formed sheet members, comprising a main housing member, second and third sheet members cooperating to define separation structure that divides said combustion chamber into two distinct zones, a primary zone and a dilution zone, said second and third sheet members defining a passage therebetween for the injection of compressor discharge air into said combustion chamber between said primary and dilution zone and a fourth sheet member cooperating with said main member to define said dilution zone and an annular port through which combustion products are discharged from said dilution zone to said expansion component, a first series of ports in said main housing member for injecting discharge air from said compression component into said primary zone toward said separation structure for deflection into a toroidal recirculation pattern of generally circular cross-sectional configuration in said primary zone, a second series of ports in said main housing member for injecting discharge air from said compression component into said dilution zone on the side of said separation structure opposite said primary zone, and structure for injecting fuel into said primary zone, said fuel injecting structure comprising a rotatably mounted fuel slinger configured to receive fuel from a stationary supply source and inject the fuel into said combustion chamber in a radial sheet of uniformly dispersed droplets, said slinger including an annular distribution surface, an annular supply region into which fuel flows from the stationary supply source, and a web separating said supply region from said distribution surface, said web having passages therethrough to accelerate the fuel to the peripheral velocity of the slinger while restricting the rate of flow onto said annular distribution surface, the toroidal recirculation pattern in said primary zone interacting with the radial flow of fuel droplets from said rotatably mounted slinger structure and achieving intimate mixing of fuel and air for uniform and efficient burning, and the injection of compressor discharge air into said dilution zone diluting the products of combustion from said primary zone prior to flow to said expansion component.

11. The turbine as claimed in claim 10 wherein said annular distribution surface is coned slightly outwardly, said slinger includes a hub having series of vanes therein for driving compressor discharge air to the rear of said slinger for cooling said combustion chamber, and an axial vent to the rear of said slinger for control of air leakage through said slinger, and said stationary fuel supply includes an annular lip portion closely adjacent and cooperating with a lip portion of said fuel slinger to define a labyrinth path, said stationary fuel supply further including an outer surface of conical configuration so that any fuel that flows to said surface tends to drop back into the rotating slinger.

12. A gas turbine comprising:

a rotatable unit, said rotatable unit including a compression component and an expansion component, a combustion chamber disposed between said compression and expansion components, said gas turbine having a gas flow path serially through said compression component, said combustion chamber, and said expansion component, said combustion chamber including separation structure dividing said combustion chamber into two distinct annular zones, a primary zone and a dilution zone, said separation structure having a dished surface, a first series of ports in said combustion chamber for injecting discharge air from said compression component into said primary zone against said dished surface of said separation structure to set up a toroidal recirculation pattern in said primary zone, fuel slinger structure at the inner periphery of said primary zone, said fuel slinger structure comprising a stationary fuel inlet supply source and structure mounted for rotation and spaced from the discharge end of said supply source for injecting the fuel radially outwardly into said primary zone, said rotatably mounted fuel slinger structure including a generally cylindrical distribution surface that is coned slightly outwardly, an annular supply region into which fuel flows from said stationary supply source, and a web separating said supply region from said distribution surface, said web having passages therethrough to accelerate the fuel to the peripheral velocity of the slinger while restricting the rate of flow onto said cylindrical distribution surface, the radial flow of fuel from said rotatably mounted slinger structure interacting with said toroidal recirculation pattern for achieving intimate mixing of fuel and air, and resulting efficient combustion within said primary zone, the resulting combustion product flowing in a radially outward direction from said primary zone past said separation structure into said dilution zone and a second series of ports in said combustion chamber for injecting discharge air from said compression component into said dilution zone on the side of said separation structure opposite said primary zone, the injection of compressor discharge air into said dilution zone diluting the products of combustion from said primary zone prior to flow to said expansion component.

13. The turbine as claimed in claim 12 wherein said rotatably mounted slinger member includes an axial vent from said annular supply region to the rear of said slinger for control of air leakage through said slinger, said web includes a portion of conical configuration that extends over the discharge end of said stationary fuel supply, and said stationary fuel supply includes a lip closely adjacent said rotatably mounted fuel slinger to define a labyrinth path and an outer surface of conical configuration so that any fuel that flows to said surface tends to drop back into the rotating slinger.

14. A gas turbine comprising
a rotatable unit, said rotatable unit including a compression component and an expansion component,
a toroidal combustion chamber disposed between said compression and expansion components, said gas turbine having a gas flow path serially through said compression component, said combustion chamber, and said expansion component, said combustion chamber including separation structure that divides said combustion chamber into two distinct zones and has a radially extending imperforate dished surface, a primary zone and a dilution zone, a first series of ports in said combustion chamber for injecting discharge air from said compression component into said primary zone toward said separation structure for deflection by said dished surface into a toroidal recirculation pattern of generally circular cross-sectional configuration in said primary zone, a second series of ports in said combustion chamber for injecting discharge air from said compression component into said dilution zone on the side of said separation structure opposite said primary zone, and structure for injecting fuel into said primary zone, said fuel injecting structure comprising a rotatably mounted fuel slinger including a radially inwardly facing annular distribution surface of generally cylindrical configuration that has a closed end and an open end axially spaced from said closed end, the flow of air in said toroidal recirculation pattern adjacent said distribution surface being generally parallel to said distribution surface and flowing in the direction from said closed end towards said open end, said distribution surface being configured to receive fuel from a stationary supply source, form that fuel into a thin annular sheet on said distribution surface and inject that fuel into said combustion chamber in a radial sheet of uniformly dispersed droplets, by flow over said open end of said distribution surface, the toroidal recirculation pattern in said primary zone interacting with the radial flow of fuel droplets from said rotatably mounted slinger structure and achieving intimate mixing of fuel and air for uniform and efficient burning, and the injection of compressor discharge air into said dilution zone diluting the products of combustion from said primary zone prior to flow to said expansion component.

15. The turbine as claimed in claim 14 wherein said combustion chamber is fabricated of a plurality of formed sheet members, comprising a main housing member in which said ports are disposed, second and third members cooperating to define a port for injection of compressor discharge air between said primary and dilution zones and a fourth member cooperating with said main member to define an annular port through which combustion products are discharged to said expansion component.

16. The turbine as claimed in claim 15 wherein said second member defines said radially extending dished surface against which the flow of air through said first series of ports is directed for deflection into said toroidal recirculating pattern.

17. The turbine as claimed in claim 16 wherein said annular distribution surface is coned slightly outwardly, said slinger includes a hub having series of vanes therein for driving compressor discharge air to the rear of said slinger for cooling said combustion chamber, and an axial vent to the rear of said slinger for control of air leakage through said slinger, and said stationary fuel supply includes an annular lip portion closely adjacent and cooperating with a lip portion of said fuel slinger to define a labyrinth path, said stationary fuel supply further including an outer surface of conical configuration so that any fuel that flows to said surface tends to drop back into the rotating slinger.

18. The turbine as claimed in claim 14 wherein said distribution surface is coned slightly outwardly.

19. The turbine as claimed in claim 14 wherein said slinger includes an axial vent to the rear of said slinger for control of air leakage through said slinger and said stationary fuel supply includes a lip closely adjacent said fuel slinger to define a labyrinth path and an outer surface of conical configuration so that any fuel that flows to said surface tends to drop back into the rotating slinger.

20. A gas turbine comprising
a rotatable unit, said rotatable unit including a compression component and an expansion component,
a toroidal combustion chamber disposed between said compression and expansion components, said gas turbine having a gas flow path serially through said compression component, said combustion chamber, and said expansion component, said combustion chamber including separation structure that divides said combustion chamber into two distinct zones, a primary zone and a dilution zone, a first series of ports in said combustion chamber for injecting discharge air from said compression component into said primary zone, a second series of ports in said combustion chamber for injecting discharge air from said compression component into said dilution zone, and structure for injecting fuel into said primary zone, said fuel injecting structure comprising a rotatably mounted fuel slinger, said slinger including a hub having series of vanes therein for driving compressor discharge air to the rear of said slinger for cooling said combustion chamber, said slinger injecting fuel into said combustion chamber in a radial sheet of uniformly dispersed droplets, the recirculation pattern in said primary zone interacting with the radial flow of fuel droplets from said rotatably mounted slinger structure and achieving intimate mixing of fuel and air for uniform and efficient burning, and the injection of compressor discharge air into said dilution zone diluting the products of combustion from said primary zone prior to flow to said expansion component.

21. A gas turbine comprising:
a rotatable unit mounted for rotation about a system axis, said rotatable unit including a compression component, an expansion component,
a combustion chamber disposed between said compression and being fabricated of a plurality of formed annular sheet members such that a primary zone and a dilution zone are defined, said formed sheet members comprising a main housing member, second and third members cooperating to define a port for injection of compressor discharge air between said primary and dilution zones and a fourth member cooperating with said main member to define an annular port through which combustion products are discharged to said expansion component, first ports of said main housing member for injecting discharge air from said compression component into said primary zone,
fuel injecting structure at the inner periphery of said primary zone for injecting fuel in a radially outward direction into said primary zone, the radial flow of fuel mixing with discharge air from said compression component with resulting combustion within said primary zone, the resulting combustion product flowing from said primary zone into said dilution zone, and second ports in said main housing member for injecting discharge air from said compression component into said dilution zone, the injection of compressor discharge air into said dilution zone diluting the products of combustion from said primary zone prior to flow to said expansion component.

22. The turbine as claimed in claim 21 wherein said second member defines a radially extending dished surface against which the flow of air through said first ports is directed for deflection into a toroidal recirculation pattern.

23. The turbine as claimed in claim 21 wherein said main housing member has an inner peripheral surface seated on a fixed turbine component on one side of said fuel injector structure and said second and third members have inner peripheral surfaces seated on a fixed turbine component on the other side of said fuel injector structure, and said fourth member has a forward portion in engagement and cooperating with said second and third members to further define a port for injection of compressor discharge air between said primary and dilution zones and a rearward portion that cooperates with said main member to define said annular port through which combustion products are discharged to said expansion component.

24. The turbine as claimed in claim 21 wherein said formed sheet members are free to move relative to one another.

25. The turbine as claimed in claim 20 and further including a third port in said combustion chamber in communication with said series of vanes for injecting compressor discharge air into said combustion chamber.

* * * * *

Disclaimer 4,040,251.—*Arnold M. Heitmann*, Swampscott, *Walter L. Brassert*, Belmont, and *Donald N. Chouinard*, Peabody, Mass. GAS TURBINE COMBUSTION CHAMBER ARRANGEMENT. Patent dated Aug. 9, 1977. Disclaimer filed July 20, 1977, by the assignee, *Northern Research and Engineering Corporation*.

The term of this patent subsequent to Aug. 2, 1994, has been disclaimed.

[*Official Gazette February 14, 1978.*]